UNITED STATES PATENT OFFICE.

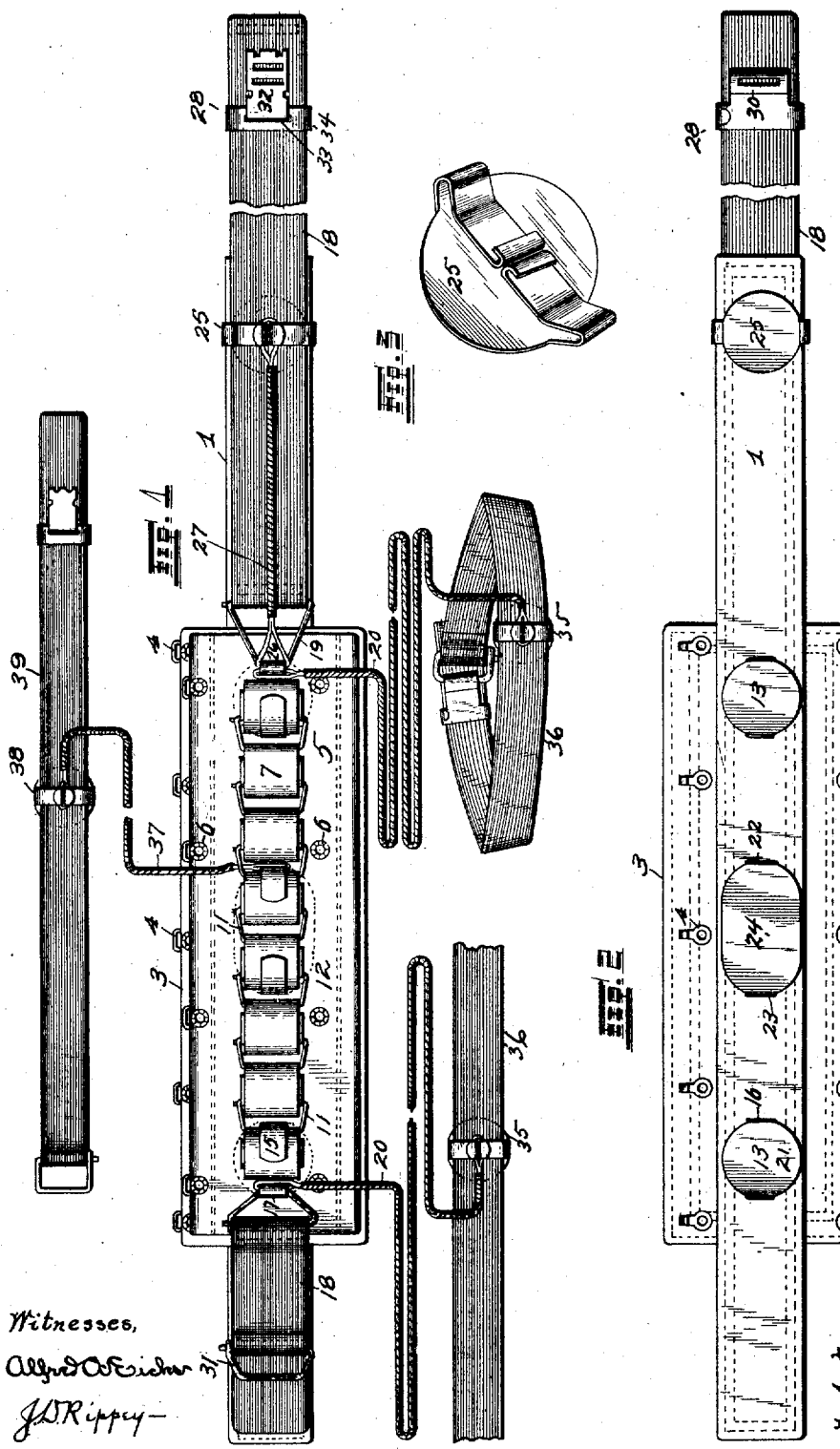

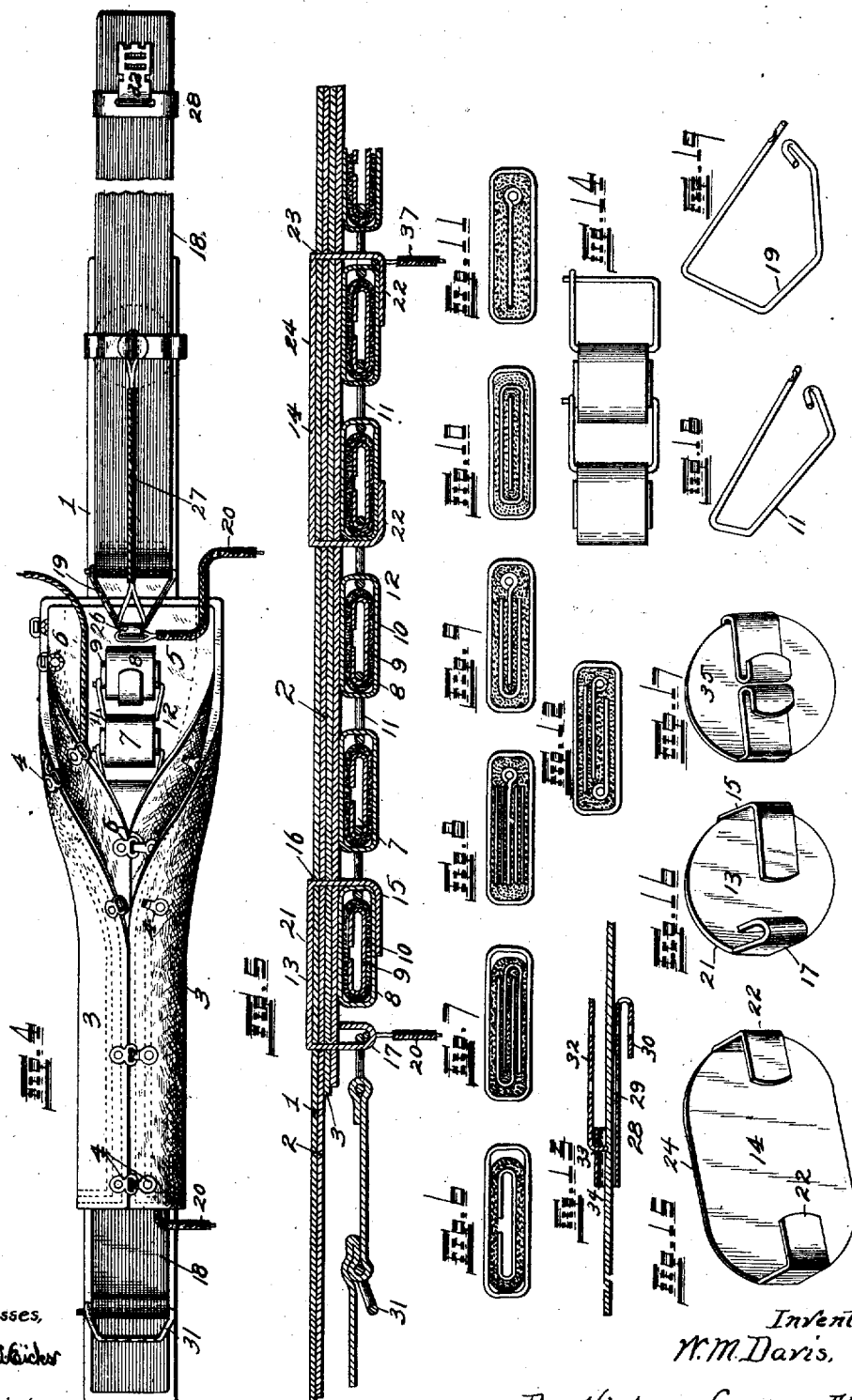

WILLSHIRE MARION DAVIS, OF SPRINGFIELD, MISSOURI.

ELECTRIC BELT.

SPECIFICATION forming part of Letters Patent No. 682,380, dated September 10, 1901.

Application filed April 9, 1900. Serial No. 12,165. (No model.)

*To all whom it may concern:*

Be it known that I, WILLSHIRE MARION DAVIS, of the city of Springfield, Greene county, State of Missouri, have invented certain new and useful Improvements in Electric and Electromagnetic Batteries with Case and Appliances, of which the following is a full, clear, and exact description, reference being had to the accompanying drawings, forming a part hereof.

My invention relates to electric belts; and it consists of the novel construction, combination, and arrangement of parts hereinafter shown, described, and claimed.

One object of this invention is to provide a device of this character consisting of a number of cells of a battery connected in proper mutual relation, and to the terminals or central parts of the battery are connected directly or through the medium of flexible and metal connections a plurality of electrodes adapted for holding the case and battery and making contact with the wearer.

Another object is the arrangement and connection of the various parts for making a complete generative device for generating an electric current to be conveyed and distributed throughout the parts of the body and the manner in which the said parts are interchangeable.

A further object of my invention is to construct a casing for supporting the electric generative elements, housing them, and preventing any substance used for assisting the generation in producing the current from coming in contact with the wearer.

In the drawings, Figure 1 is a plan view of my complete invention, showing the outer casing and safety-cloth open, giving a perfect view of the construction of the battery and the connection with the elastic webs for conveying the current to the various parts of the body. Fig. 2 is a rear elevation of the same with the elastic connections removed. Fig. 3 is a perspective view in detail of one electrode made use of in connection with my invention. Fig. 4 is a front elevation of the belt with the safety-cloth and outer casing partly open, showing the manner of its construction and the means of supporting the battery. Fig. 5 is an enlarged horizontal sectional view of the battery, showing its construction. Fig. 6 is a detail end elevation of one of the cells or generators detached from the belt. Figs. 7, 8, 9, 10, 11, and 12 are end views of modified forms of generators which may be used in connection with my invention. Fig. 13 is a horizontal sectional view of a two-part clasp made use of in holding the belt around the body of the wearer. Fig. 14 is a modified form of the battery which I may use in my invention. Fig. 15 is a perspective view of the double electrode which I use to connect the center cells of the battery. Fig. 16 is a perspective view of the single electrode which is connected with the battery. Fig. 17 is a perspective view of one of the electrodes used on the elastic web which is applied around the limbs of the wearer. Fig. 18 is a perspective view of the loop-link secured to one end of the elastic web of the belt. Fig. 19 is a perspective view of the loop-link connected to the elastic web for supporting one of the electrodes.

In the construction of the device as shown and for clear illustration, I refer particularly to Figs. 1, 2, 4, and 5.

I provide a case-protector 1, which is composed of a strip of soft flexible material and is of sufficient length to extend around a portion of the body, and connected thereto is a battery-support 2, which is also of like material. To this strip I secure in any desirable manner an outer casing 3, which is provided with any number of hooks and eyes 4, by which said casing may be folded and held together over the elements hereinafter described. Upon the inside of the outer casing 3 I apply a safety-cloth 5, which is composed of material such as oil-cloth, rubber, or any waterproof material, and is also provided with a plurality of hooks and eyes 6, designed for the same purpose as those formed upon the outer casing 3. Upon the inner surface of the safety-cloth 5 I apply a plurality of cells or electric generators 7, which are composed of the outer shell 8, which may be in reality either positive or negative and are each provided with an inner shell 9, held out of contact with each other by a mass of wadding 10 or suitable absorbent material. The cells are connected by links 11, one end coming in communication with the outer shell 8 and its other with the inner shell of the adjacent cell, forming a complete electric generative battery 12.

The battery is supported to the belt proper by means of electrodes 13 and 14, the electrode 13 being provided with a projection 15, passed through a slot 16, formed through the various materials of the belt and bent and brought in close communication with the upper surface of the outer casing 8 of the end cells. The electrode is also provided at its opposite end with a projection 17, also passed through a slot formed in the belt and bent U shape, providing a support for the ends of the flexible web 18. The web 18 is held to the support by the use of the loop-links 19, so arranged as to be applied and released with ease. The U-shaped support of the electrode 13 also acts as a contact-point for one of the elastic cords 20. The outer surface 21 of the electrode 13 may be of any shape and is designed to come in contact with the body of the wearer. The electrode 14 is arranged about the center of the battery, being provided at each end with projections 22, each passed through slots 23, formed in the belt and suitably bent and passed over opposite ends of two of the cells or generators, and its outer surface 24 is designed to come in contact with the wearer. The electrodes 14 may be of high-resistance material, thereby deflecting the current and avoiding short circuit, or, if preferred, the end may be insulated to accomplish the same result. This matter, however, is one of preference, and it can be determined by usage which is the most efficient. I may arrange on the belt as many electrodes as desired; but I show in the drawings only three, which are sufficient to demonstrate the operation of my invention.

Upon the elastic web 18 I provide an electrode 25, (see Figs. 1 and 3,) which is connected to the U-shaped support 26 by means of an elastic electric cord 27. I also provide on said web a two-piece clasp 28, composed of a metallic strip 29, having one end formed into a hook 30, with which is adapted to come in contact the eye 31, formed on the web at the opposite end of the belt, by which the same is supported around the body of the wearer. The clasp 28 is held upon the web by means of the strip 32, having one end bent and provided with teeth and passed through a slot 33, formed in the shell 34 of the metallic strip and suitably held there in any desirable manner. The object of the elastic electric cord 20, which I connect to the U-shaped supports 26, is to convey the electric current to the electrodes 35, formed on the elastic webs 36, arranged to be passed around the limbs or any portion of the body of the wearer. I also apply in any desirable manner to one projection of the electrode 14 an elastic electric cord 37, one end communicating with the electrode 38, formed on a similar elastic web 39, designed to be placed upon the upper portion of the body. These elastic webs are also provided with my improved two-piece clasp.

I may arrange the battery in many different ways and the connections may be also arranged as shown in Fig. 14.

By referring to Figs. 7 to 12, inclusive, I show a construction of batteries which I may also use instead of the one shown connected to the belt in Fig. 5.

The batteries are generally constructed of zinc and copper, each metal being separated from the other by a filament of absorptive material. In order to render the batteries active, I dampen the absorptive material between the elements with a solution of ordinary table-salt and water, although any desired salt may be employed, and, if preferred, a weak acid solution may be employed. The purpose of the casing in which the battery is housed is to prevent the dampness from the battery affecting the clothing and wetting the patient.

The electrodes made use of in my invention may be any desired shape—circular, square, oblong, or, in fact, a shape which may be designed and more preferable than those stated.

By the construction of the battery as described an active positive and an active negative current will be produced. I accomplish this by using at least one positive and one or more negative electrodes connected with each battery and by the battery being absolutely jointed to and held by the electrodes. When every electrode is used, my battery will act on all positive and negative electrodes, carrying the electric current through all parts of the body; but to produce the positive or negative currents there must be at least one positive and one negative electrode in the belt, but two or more positive and negative electrodes may be used in one belt with a single battery.

I may construct the batteries with the outer shell of each alternate generator of copper and the intermediate shells of zinc, or I may use the outer shells of the entire series of generators of copper and the inner shells of zinc, or vice versa. By this arrangement the generative action will be regulated to suit the condition of the patient wearing the same.

I do not desire to limit myself to the precise construction and manner of the arrangement of the battery as described, and shown in the drawings, but show this construction for a clear demonstration of the action of my invention.

I claim—

1. An electric belt and battery comprising a plurality of cells of a battery connected in series, a fabric covering for said cells, electrodes having radial extensions passed through said covering and engaging each end cell of the battery, an electrode having radial fingers passed through the cover and engaging intermediate cells of battery, and means for securing said fabric about the person, substantially as specified.

2. An electric belt, comprising a plurality of cells of a battery connected in series, a fabric covering for said cells, an electrode connected with each terminal cell of battery, an additional electrode connected flexibly with each of said first-named electrodes, an electrode connected with intermediate cells of the battery, an electrode flexibly connected with the intermediate electrode, a fabric connected with the battery and adapted for attachment to the person, and a fabric having connecting means and connected directly with each of said flexibly-connected electrodes, substantially as specified.

3. In an electric belt, the combination with a battery of an electrode comprising a contact-plate having outwardly-extending fingers bent to lie parallel with the plate, and a cell of said battery held between the plate and the fingers thereof and in electrical connection with the latter, substantially as specified.

4. In an electric belt, the combination with a battery of an electrode comprising a contact-plate having radiating fingers bent to lie parallel with the plate and receive a cell or double cells of the battery between them and the plate, the extremities of said fingers being bent outwardly to lie parallel with the body portions thereof, and a flexible connection with the adjacent portions of said fingers and having an electrode connected therewith, substantially as specified.

In testimony whereof I affix my signature in presence of two witnesses.

W. MARION DAVIS.

Witnesses:
M. A. HUGHES,
ANDY H. HAMPTON.